United States Patent
Lonas et al.

(10) Patent No.: US 12,522,055 B2
(45) Date of Patent: Jan. 13, 2026

(54) OPERATING DUAL CLOSURES UTILIZING A COMMON SYSTEM

(71) Applicant: Rivian IP Holdings, LLC, Irvine, CA (US)

(72) Inventors: Travis James Lonas, Foothill Ranch, CA (US); Nicholas Kalayjian, Redwood City, CA (US); Thorsten Luedtke, Orange, CA (US); Jacob Wasser, Mission Viejo, CA (US); Marcus Edward Merideth, Irvine, CA (US); Geoffrey Young, Pasadena, CA (US); Hao Sun, Tustin, CA (US); Richard Sukhdeo, Lake Forest, CA (US); Phillip Whitton, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 62 days.

(21) Appl. No.: 18/484,414

(22) Filed: Oct. 10, 2023

(65) Prior Publication Data
US 2025/0115100 A1    Apr. 10, 2025

(51) Int. Cl.
*B60J 1/18* (2006.01)
*B60J 5/10* (2006.01)
*E05F 15/622* (2015.01)

(52) U.S. Cl.
CPC ............. *B60J 1/1884* (2013.01); *B60J 5/101* (2013.01); *E05F 15/622* (2015.01)

(58) Field of Classification Search
CPC ...................................................... B60J 1/1884
See application file for complete search history.

(56) References Cited

U.S. PATENT DOCUMENTS

| | | | | |
|---|---|---|---|---|
| 4,184,709 | A * | 1/1980 | Kim | B60J 1/1823 296/146.13 |
| 6,089,640 | A * | 7/2000 | Cart | B60J 1/1884 296/146.8 |
| 6,220,649 | B1 * | 4/2001 | Rife | B60J 5/101 296/146.12 |
| 6,361,097 | B1 * | 3/2002 | Lechkun | B60J 5/103 296/76 |
| 6,607,231 | B2 * | 8/2003 | Paiva | B62D 25/00 296/146.8 |
| 6,860,537 | B2 * | 3/2005 | Seksaria | B60J 1/1884 296/146.5 |
| 8,414,049 | B2 * | 4/2013 | Parker | B60R 5/045 296/37.16 |

(Continued)

FOREIGN PATENT DOCUMENTS

| | | | | |
|---|---|---|---|---|
| CN | 113279651 A | * | 8/2021 | E05D 15/50 |
| DE | 19615540 A1 | * | 4/1997 | B60J 1/1884 |

(Continued)

*Primary Examiner* — Catherine A Kelly
(74) *Attorney, Agent, or Firm* — BAKERHOSTETLER

(57) ABSTRACT

A system for actuating closures of a vehicle includes drive units and latches. The drive units may couple to one of the closures and may be used to control movement of the closure relative to another closure. Using the latches, the closures may be coupled together and the same drive units can be used to control movement of both closures together. The controlled movement of the closures may be automated by using a controller and one or more motors.

19 Claims, 13 Drawing Sheets

(56) References Cited

U.S. PATENT DOCUMENTS

| | | | | |
|---|---|---|---|---|
| 8,638,205 | B2* | 1/2014 | Boehme | E05F 15/43 |
| | | | | 340/436 |
| 9,284,768 | B2* | 3/2016 | Sasaki | E05F 15/63 |
| 9,636,978 | B2* | 5/2017 | Warburton | E05F 15/622 |
| 9,822,570 | B2* | 11/2017 | Jaranson | E05F 15/70 |
| 10,415,296 | B2* | 9/2019 | Mayr | E05F 15/70 |
| 10,422,174 | B2* | 9/2019 | Felix Frias | B60J 1/004 |
| 11,261,645 | B2* | 3/2022 | Sauerwein | F16D 65/186 |
| 2005/0253406 | A1* | 11/2005 | Faubert | B60J 1/1884 |
| | | | | 296/51 |
| 2020/0332586 | A1* | 10/2020 | Söderqvist | E05F 15/40 |
| 2024/0287837 | A1* | 8/2024 | Nakashima | E05F 15/70 |
| 2024/0301655 | A1* | 9/2024 | Kim | B60J 5/12 |

FOREIGN PATENT DOCUMENTS

| | | | | |
|---|---|---|---|---|
| DE | 102006001057 A1 * | 7/2007 | | B60J 5/101 |
| DE | 102009052368 A1 * | 5/2011 | | B60J 5/101 |
| EP | 1764247 A2 * | 3/2007 | | B60J 5/104 |
| EP | 1902882 A2 * | 3/2008 | | B60J 5/12 |
| FR | 2976858 A1 * | 12/2012 | | B60J 5/101 |

\* cited by examiner

OPERATING DUAL CLOSURES UTILIZING A COMMON SYSTEM

This application is directed to the operation of multiple closures of a vehicle with one or multiple drive unit(s). For example, the drive unit(s) may be used to operate closures, such as a liftgate and/or an inset closure (e.g., a glass substrate or another substrate).

SUMMARY

The subject technology is directed to the use of a drive unit (or set of drive units) to control movement (e.g., open and close) of closures such as a liftgate and a glass substrate of a vehicle, as well as utilizing components (e.g., latches) with drive units to control movement of the closures. In one or more implementations, a drive unit (representative of one or more drive units) is used to control movement a glass substrate. When one or more latches couple the glass substrate to a liftgate, subsequent operation of the same drive unit can control movement of both the glass substrate and the lift gate. Accordingly, the same drive unit(s) can either move the liftgate together with the glass substrate, or move only the secondary closure. Beneficially, the drive unit(s) can control movement of multiple closures based on a latch position, thereby minimizing the number of drive units required in the vehicle.

In accordance with one or more aspects of the disclosure, a system is described. The system may include a drive unit. The system may further include a first closure coupled to the drive unit. The system may further include a second closure coupled to the first closure. The system may further include a latch, representative of one or more latches. In one or more implementations, in a first position of the latch(es), movement of the drive unit causes the first closure to move relative to the second closure. In one or more implementations, in a second position of the latch(es), movement of the drive unit causes the second closure to move with the first closure.

The first closure may include a glass substrate. The second closure may include a liftgate configured to receive the glass substrate. The drive unit may include a power strut.

The system may further include a user input. In one or more implementations, the drive unit and the latch(es) are controllable by an input to the user input.

The system may further include a hinge, representative of one or more hinges, coupled to the second closure. In one or more implementations, the system includes a vehicle. The hinge(s) may be coupled to the vehicle. The second latch(es) may releasably couple the second closure to the vehicle.

In a first mode, the drive unit may be configured to position the first closure at a first angle. In a second mode, the drive unit may be configured to position the first closure at a second angle different from the first angle. The system may further include a sensor. In one or more implementations, the drive unit is configured to position the first closure the first angle based on the sensor. In one or more implementations, the sensor includes at least one of a speed sensor, an image sensor, a proximity sensor, or a liquid sensor.

In accordance with one or more aspects of the disclosure, a vehicle is described. The vehicle may include a body. The vehicle may further include a liftgate configured to carry a glass substrate. The vehicle may further include a first latch configured to releasably couple the glass substrate with the liftgate. The vehicle may further include a second latch configured to releasably couple the liftgate with the body.

The vehicle may further include a controller configured to provide a first set of instructions that causes the first latch to release the glass substrate from the liftgate. The controller may further be configured to provide a second set of instructions to cause i) the first latch to link the glass substrate to the liftgate and ii) the second latch to release the liftgate from the body.

The vehicle may further include a drive unit. In one or more implementations, the controller is further configured to provide the first set of instructions to further cause the drive unit to actuate glass substrate to move relative to the liftgate. Additionally, the drive unit may further be configured to provide the second set of instructions to further cause the drive unit to actuate the glass substrate, thereby causing the liftgate to move with the glass substrate based on the first latch. The controller may be further configured to provide a third set of instructions that causes i) the first latch to release the glass substrate from the liftgate and ii) the drive unit to move the glass substrate in accordance with a first mode. The controller may be further configured to provide a fourth set of instructions that causes i) the first latch to release the glass substrate from the liftgate and ii) the drive unit to move the glass substrate in accordance with a second mode different from the first mode.

In one or more implementations, the drive unit includes a power strut. In one or more implementations, the drive unit further includes a motor, and the first set of instructions causes the motor to actuate the power strut.

The vehicle may further include a user input. In one or more implementations, the controller is further configured to provide, based on a first input to the user input, the first set of instructions. The controller may further be configured to provide, based on a second input to the user input, the second set of instructions.

The vehicle may further include a biasing mechanism coupled to the body and the liftgate. In one or more implementations, in response to the controller providing the second set of instructions, the biasing mechanism counterbalances the liftgate.

In accordance with one or more aspects of the disclosure, a method is described. The method may include receiving a first command that causes a first latch to release a first closure from a second closure. The method may further include receiving a second command that causes i) the first latch to link the first closure to the second closure and ii) a second latch to release the second closure from a body of a vehicle. In one or more implementations, receiving the first command to further cause a drive unit to actuate first closure to move relative to the second closure. Additionally, in one or more implementations, receiving the second command to further cause the drive unit to actuate the first closure, thereby causing the second closure to move with the first closure based on the first latch.

The method may further include receiving a third command that causes i) the first latch to release the first closure from the second closure and ii) the drive unit to move the first closure in accordance with a first mode.

The method may further include receiving, from a user input, an input. In one or more implementations, receiving the input initiates one of the first command or the second command.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is directed to utilizing a drive unit to control movement of one or more closures of a vehicle. A "drive unit" refers to an assembly of components in which at least one component is actuated, and the actuated component(s) is used to move one or more closures of the vehicle. For example, in one or more implementations, the drive unit takes the form of a power strut in which a shaft is operated by automated means (e.g., a motor). Further, the drive unit (representative of one or more drive units) is coupled to a closure (e.g., glass substrate or window) of the vehicle, and is operable to move the closure. Using one or more latches, the closure may be coupled to another closure (e.g., liftgate). When the closures are coupled together by the latch(es), the drive unit may be operable to move both closures. Beneficially, vehicles described herein may rely on one drive unit, or one set of drive units operating together as a common system, to control movement of multiple closures.

Figure 1:
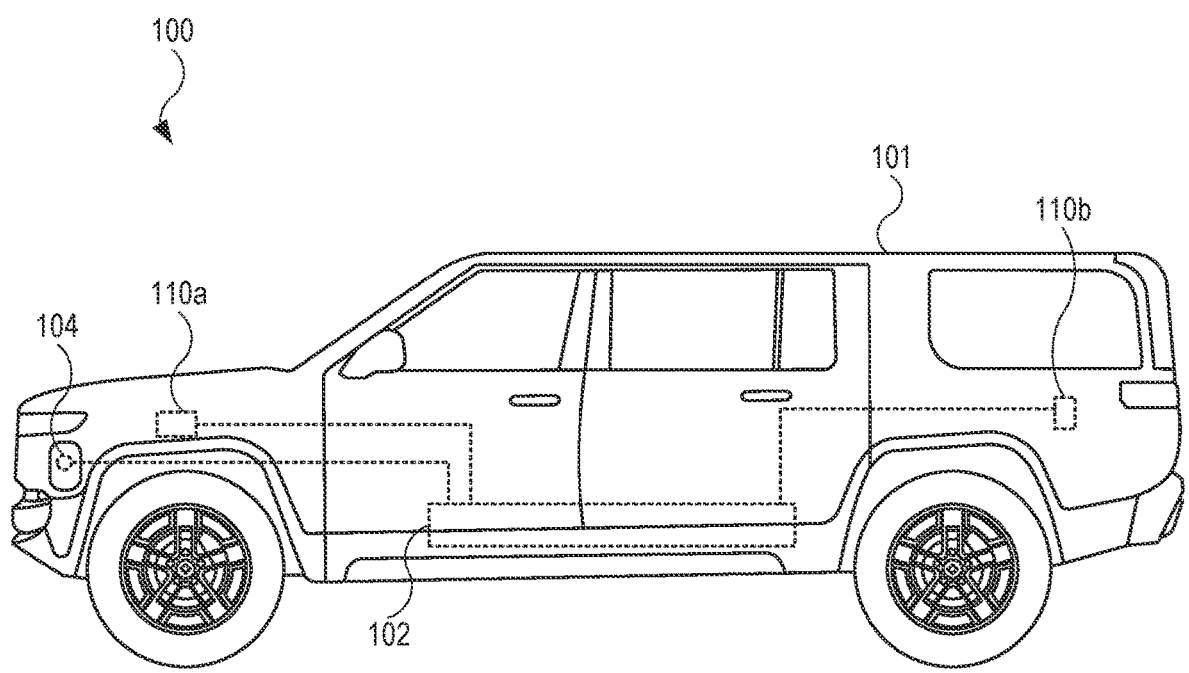
FIG. 1 illustrates a side view of an example of a vehicle, in accordance with aspects of the present disclosure.

FIG. 1 illustrates an example of a vehicle 100, in accordance with aspects of the present disclosure. In one or more implementations, the vehicle 100 is a truck. In the example shown in FIG. 1, the vehicle 100 is a sport utility vehicle (SUV). Generally, the vehicle 100 may take the form of any motorized vehicle, including motorized vehicles with an internal combustion engine and/or one or more electric motors. Accordingly, other implementations of the vehicle 100 may include land-based vehicles, such as a car (e.g., sedan, hatchback), a van, or a commercial truck, as non-limiting examples.

The vehicle 100 may include a body 101. In one or more implementations, the body 101 is formed from a metal, as a non-limiting example. The vehicle 100 may include a battery pack 102. The battery pack 102 may be coupled (e.g., electrically coupled) to one or more electrical systems of the vehicle 100 to provide power to the one or more electrical systems. The vehicle 100 may further include a port 104 (e.g., charge port) designed to receive a cable connector (not shown in FIG. 1) used to transmit power (e.g., alternating current (AC) power) that is converted to direct current (DC) power to charge the battery pack 102. The vehicle 100 may include various other components, such as a motor 110a and a motor 110b (e.g., electric motors), as non-limiting examples.

Figure 2:
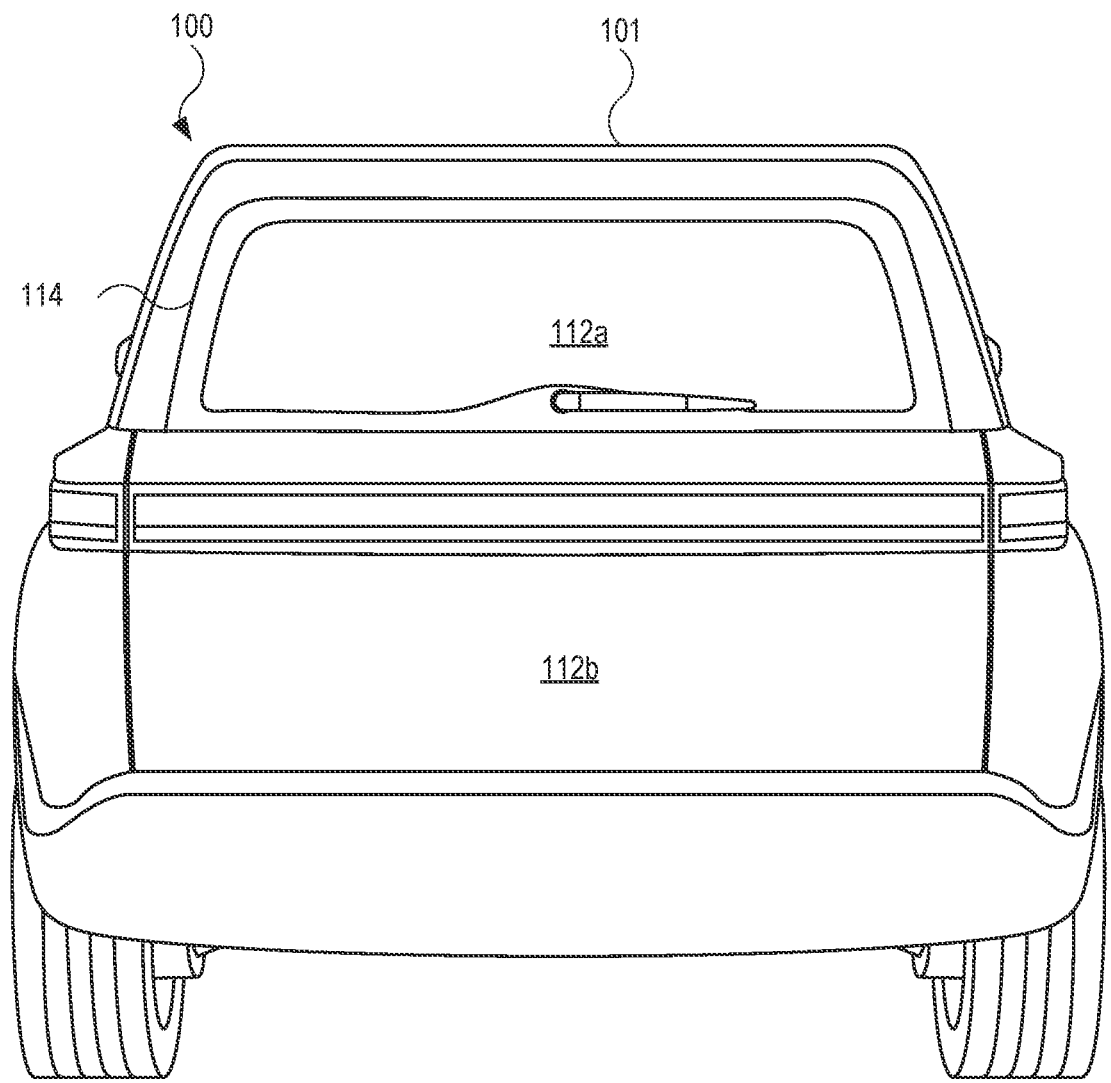
FIG. 2 illustrates a rear view of a vehicle, showing additional features of the vehicle, in accordance with aspects of the present disclosure.

FIG. 2 illustrates a rear view of the vehicle 100, showing additional features of the vehicle 100, in accordance with aspects of the present disclosure. For example, the vehicle 100 may include a closure 112a and a closure 112b. In one or more implementations, the closure 112a takes the form, at least in part, of a substrate. For example, the closure 112a may include a glass substrate or other transparent substrate (e.g., rigid plastic substrate). Alternatively, the closure 112a may include an opaque or semi-opaque substrate. For example, in one or more implementations, the closure 112a includes a metal or opaque plastic plate. Moreover, the closure 112a may include at least some of the same material(s) as that of the vehicle 100. For example, when the body 101 or a door (shown in FIG. 1) of vehicle 100 includes a metal (e.g., steel, aluminum, or a combination thereof), the closure 112a may also include the same metal(s). In another example, the exterior of the vehicle 100 may include a non-metal (e.g., plastic, carbon fiber, or a combination thereof), and the closure 112a may also include the same non-metal(s). Further, the appearance (e.g., color) of the closure 112a may be the same as that of the vehicle 100. In this regard, the closure 112a may include one or more of a metal or a non-metal that is painted with the same paint, including the same color of paint color, as that of the vehicle 100.

The vehicle 100 may further include a closure 112b coupled to the body 101. In one or more implementations, the closure 112b is a liftgate. In this regard, the closure 112b may move and allow internal access to the vehicle 100 via a rear portion of the vehicle 100. As shown, the closure 112b surrounds the closure 112a. Also, the closure 112b may form an opening 114, and the closure 112a may be seated in the opening 114. In this regard, the closure 112a may include an inset closure that is positioned within the closure 112b. Further, the closures 112a and 112b may be coupled together by one or more hinges (not shown in FIG. 2).

Figure 3:
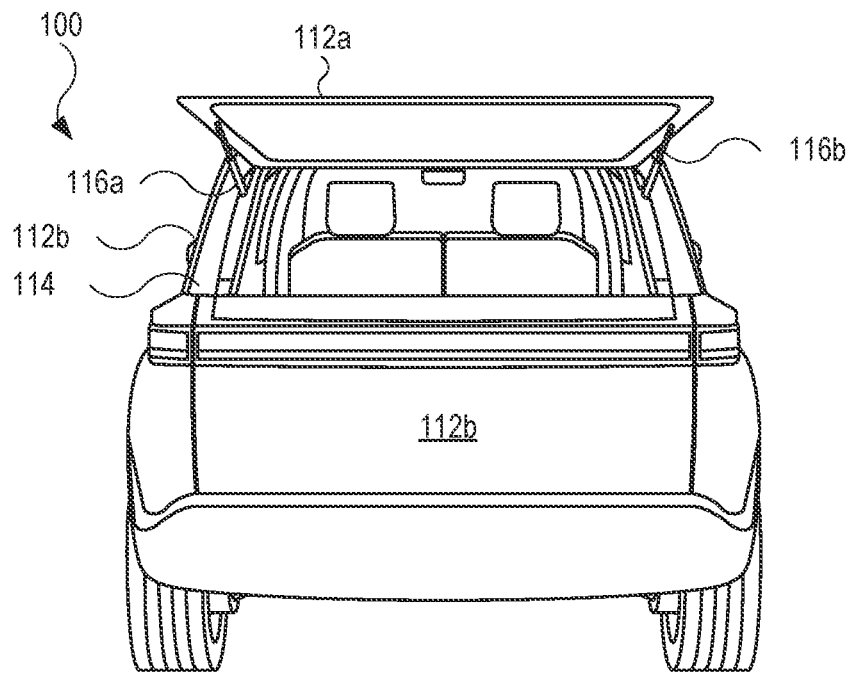
FIG. 3 illustrates a rear view of a vehicle, showing a closure of the vehicle in an open position, in accordance with aspects of the present disclosure.

FIG. 3 illustrates a rear view of the vehicle 100, showing the closure 112a of the vehicle 100 in an open position, in accordance with aspects of the present disclosure. As shown, the closure 112a is removed from the opening 114 of the closure 112b. In order to move (e.g., open and close) the closure 112a, the vehicle 100 may include a drive unit 116a and a drive unit 116b. Each of the drive units 116a and 116b may be coupled (e.g., fastened, secured, adhered, or the like) to the closure 112a. In one or more implementations, each of the drive units 116a and 116b takes the form of a strut. Moreover, in one or more implementations, each of the drive units 116a and 116b takes the form of a power strut. In this regard, each of the drive units 116a and 116b may be operated by, for example, a motor (e.g., electric motor).

Figure 4:
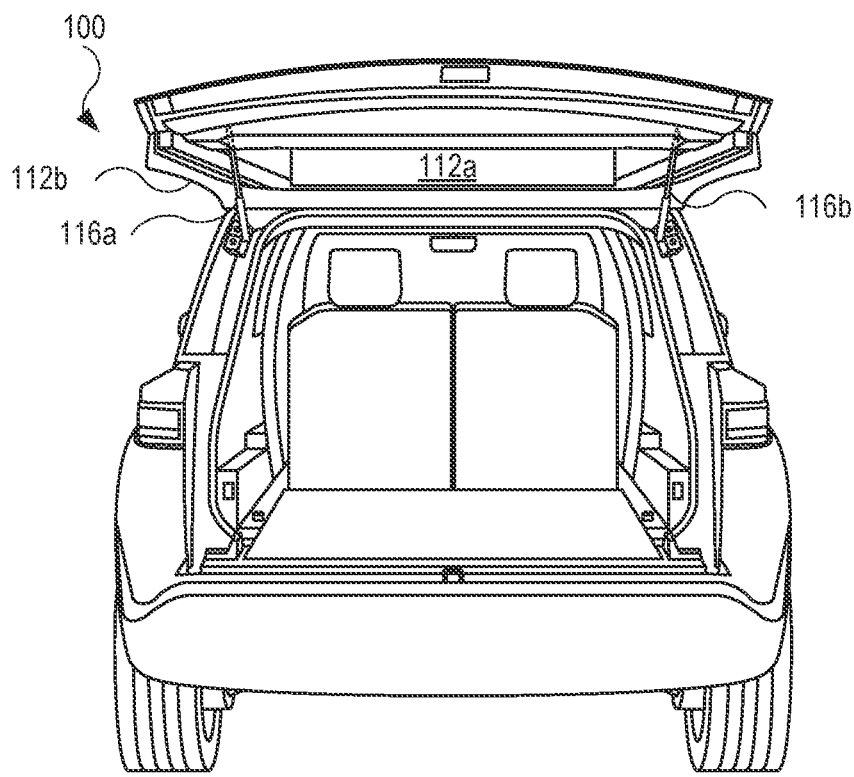
FIG. 4 illustrates a rear view of a vehicle, showing an additional closure of the vehicle in an open position, in accordance with aspects of the present disclosure.

FIG. 4 illustrates a rear view of the vehicle 100, further showing the closure 112a and the closure 112b of the vehicle 100 in an open position, in accordance with aspects of the present disclosure. The drive units 116a and 116b may be used to control movement of both the closure 112a and the closure 112b, thus providing additional internal access to the vehicle 100. For example, when the closure 112a is positioned in the opening 114 of the closure 112b (as shown in FIG. 2), the closures 112a and 112b may be coupled together by one or more latches (not shown in FIG. 4). Further, based on the closures 112a and 112b being coupled together by the one or more latches, the drive units 116a and 116b may control movement of the closures 112a and 112b to open the closures 112a and 112b as shown in FIG. 4 without a direct coupling (e.g., direct attachment) between the closure 112b and the drive units 116a and 116b. Accordingly, the drive units 116a and 116b are designed, in some instances, to operate the closure 112a independently of the closure 112b (as shown in FIG. 3) or simultaneously both of the closures 112a and 112b together. Beneficially, the number of components (e.g., drive units) of the vehicle 100 may be reduced, which may reduce the manufacturing cost. Additionally, in one or more implementations, one of the drive unit 116a or the drive unit 116b is used to control movement of the closure 112a independently of the closure 112b (as shown in FIG. 3) or simultaneously both of the closures 112a and 112b together.

Referring to FIG. 3 and FIG. 4, the closures 112a and 112b may be opened and closed by automated means. In this regard, the drive units 116a and 116b may be operated by a user from a remote location, such as when the user is a driver or passenger sitting in the vehicle 100 or by using a software application (e.g., app) running on a mobile wireless communication device (e.g., smartphone). Beneficially, movement of the closure 112a or a combination of the closures 112a and 11b may be controlled by a user without manually grasping or otherwise contacting either of the closures 112a and 112b.

Figure 5:
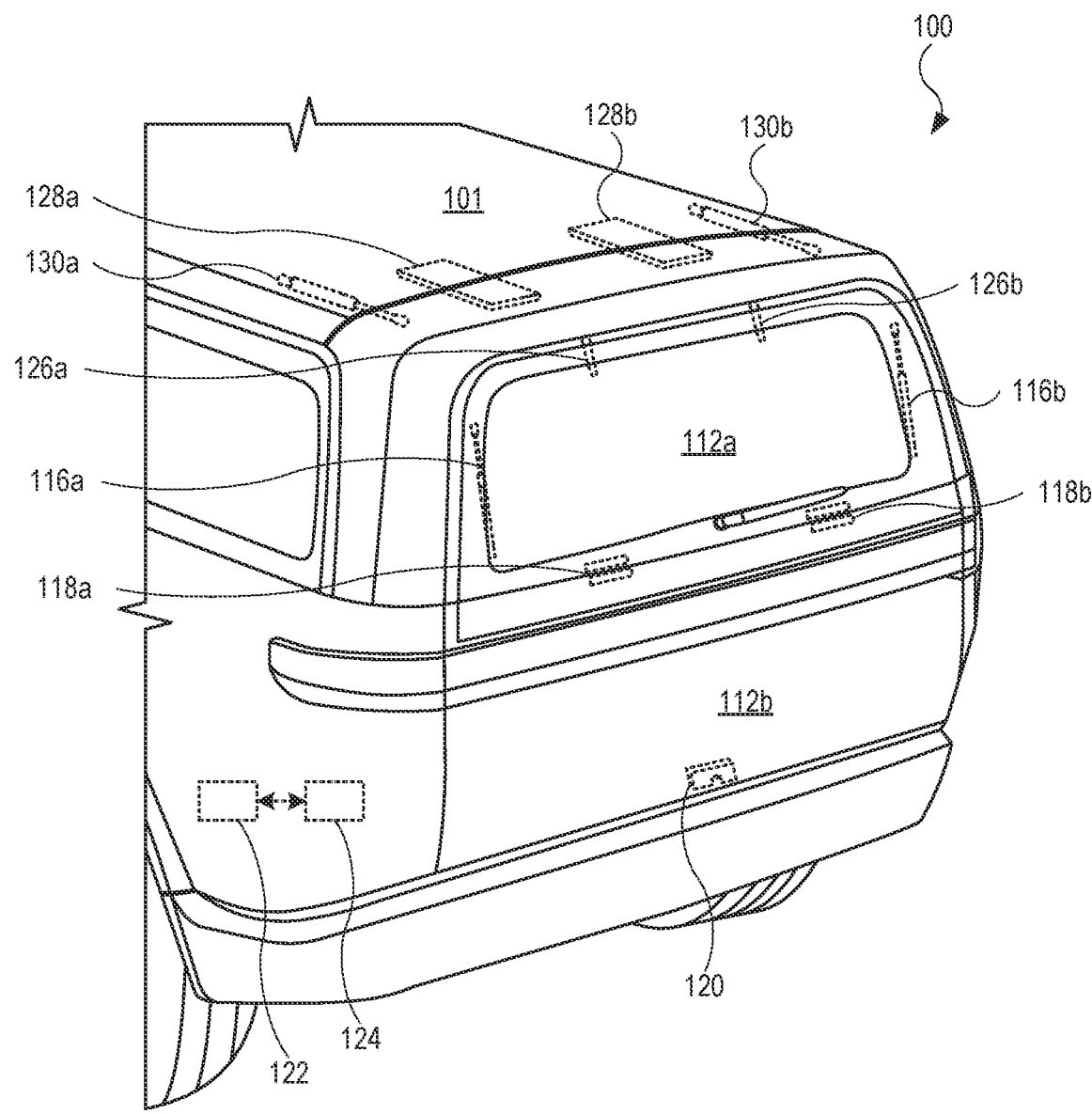
FIG. 5 illustrates a rear perspective view of a vehicle, showing several components used to control movement of closures of the vehicle, in accordance with aspects of the present disclosure.

FIG. 5 illustrates a rear perspective view of the vehicle 100, showing several components used to control movement of the closures 112a and 112b of the vehicle 100, in accordance with aspects of the present disclosure. In addition to the drive units 116a and 116b, the vehicle 100 may utilize several additional components to control movement of the closure 112a and/or the closure 112b. For example, the vehicle 100 may include a latch 118a and a latch 118b. In one or more implementations, a portion of the latch 118a is coupled to the closure 112a and the other portion of the latch 118a is coupled to the closure 112b. Similarly, a portion of the latch 118b is coupled to the closure 112a and the other portion of the latch 118b is coupled to the closure 112b. Based on operation of the latches 118a and 118b, the closures 112a and 112b may be coupled together. However, the latches 118a and 118b may also be used to decouple the closures 112a and 112b from each other. Put another way, each of the latches 118a and 118b is designed to releasably couple the closure 112a from the closure 112b.

The closure 112b may include a latch 120 designed to releasably couple with the vehicle 100. For example, in a closed position (shown in FIG. 5), the latch 120 secures the closure 112b to the vehicle 100. Alternatively, the latch 120 may decouple from the vehicle 100, thus allowing the closure 112b to transition to an open position (e.g., shown in FIG. 4). In one or more implementations, the latch 120 is coupled to the vehicle 100 (e.g., not connected to the closure 112b) and is operable to releasably couple the closure 112b with the vehicle 100.

In order to operate the closures 112a and 112b in an automated manner, the vehicle 100 may further include a controller 122 in electrical communication with the drive units 116a and 116b, the latches 118a and 118b, and the latch 120. In one or more implementations, the controller 122 receives inputs from a user and provides commands to one or more of the drive units 116a and 116b, the latches 118a and 118b, and the latch 120, thus controlling movement of one or more of the closures 112a and 112b to a desired position in accordance with the user input. For example, the drive units 116a and 116b, the latches 118a and 118b, and the latch 120 may each include a motor (not shown in FIG. 5), such as an electric motor, that is operable to provide mechanical work based on commands or instructions received from the controller 122. For example, the motor may provide mechanical work to actuate the drive units 116a and 116b. Alternatively, or in combination, the vehicle 100 may further include a motor 124 used to provide mechanical work for components that to not include a motor.

In order to facilitate movement of the closure 112a, the vehicle 100 may include a hinge 126a and a hinge 126b. As shown, the hinges 126a and 126b are coupled to the closure 112a and the closure 112b. The hinges 126a and 126b may promote movement (e.g., rotational movement about a first axis of rotation) of the closure 112a relative to remaining portions of the vehicle 100, including the closure 112b. Similarly, in order to facilitate movement (e.g., rotational movement) of the closure 112b, the vehicle 100 may include a hinge 128a and a hinge 128b. As shown, the hinges 128a and 128b are coupled to the body 101 of the vehicle 100 as well as to the closure 112b. The hinges 128a and 128b may promote movement of the closure 112b about a second axis of rotation relative to at least some remaining portions of the vehicle 100. Further, due in part to the closure 112b being capable of moving in conjunction with the closure 112a, the hinges 128a and 128b may promote movement of the closure 112a. In one or more implementations, the drive units 116a and 116b cause the hinges 126a and 126b to pivot in order to move the closure 112a relative to the closure 112b. In one or more implementations, the drive units 116a and 116b cause the hinges 128a and 128b to pivot in order to move the closures 112a and 112b relative to the body 101.

In order to maintain the closure 112b in the open position (as shown in FIG. 4), the hinge 128a and 128b may be designed to collectively support the weight of both of the closures 112a and 112b. However, the vehicle 100 may be equipped with additional features to support the weight of the closures 112a and 112b. For example, the vehicle 100 may include a biasing mechanism 130a and a biasing mechanism 130b. In one or more implementations, each of the biasing mechanisms 130a and 130b takes the form of a gas strut. Alternatively, one or more implementations, each of the biasing mechanisms 130a and 130b takes the form of a spring. In this regard, each of the biasing mechanisms 130a and 130b is designed to counterbalance the weight of the closures 112a and 112b.

While FIG. 5 shows and describes a system with multiple pairs of components (e.g., drive units 116a and 116b, latches 118a and 118b, and biasing mechanisms 130a and 130b) for controlling movement of the closures 112a and 112b, in one or more implementations, the vehicle 100 may not require the components to be in pairs. For example, in one or more implementations, the vehicle 100 includes the drive unit 116a but not the drive unit 116b. Further, in one or more implementations, the vehicle 100 includes the latch 118a but not the latch 118b. Still further, in one or more implementations, the vehicle 100 includes the hinge 126a and the hinge 128a but not the hinge 126b and the hinge 128b. Still further, in one or more implementations, the vehicle 100 includes the biasing mechanism 130a but not the biasing mechanism 130b. In instances when the vehicle 100 includes one of the aforementioned components, the components may nonetheless be used to control movement of the closure 112a or a combination of the closures 112a and 112b. Moreover, the respective positions of the components on or in the vehicle 100 as shown and described in FIG. 5 are exemplary only, and the position of the components may be in other locations on or in the vehicle 100. For example, one or more implementations, a single drive unit (e.g., drive unit 116a) and a single hinge (e.g., hinge 126a) are each coupled to the closures 112a and 112b, and the single drive unit and the single hinge are centered, or centrally located on the vehicle 100, including centrally located with respect to the closures 112a and 112b. Additionally, while FIG. 5 shows the closure 112b being coupled with the drive units 116a and 116b using the latches 118a and 118b, in one or more implementations, the drive units 116a and 116b are connected (e.g., directly connected) to the closure 112b, and the closure 112a is coupled with the drive units 116a and 116b using the latches 118a and 118b.

Figure 6A:
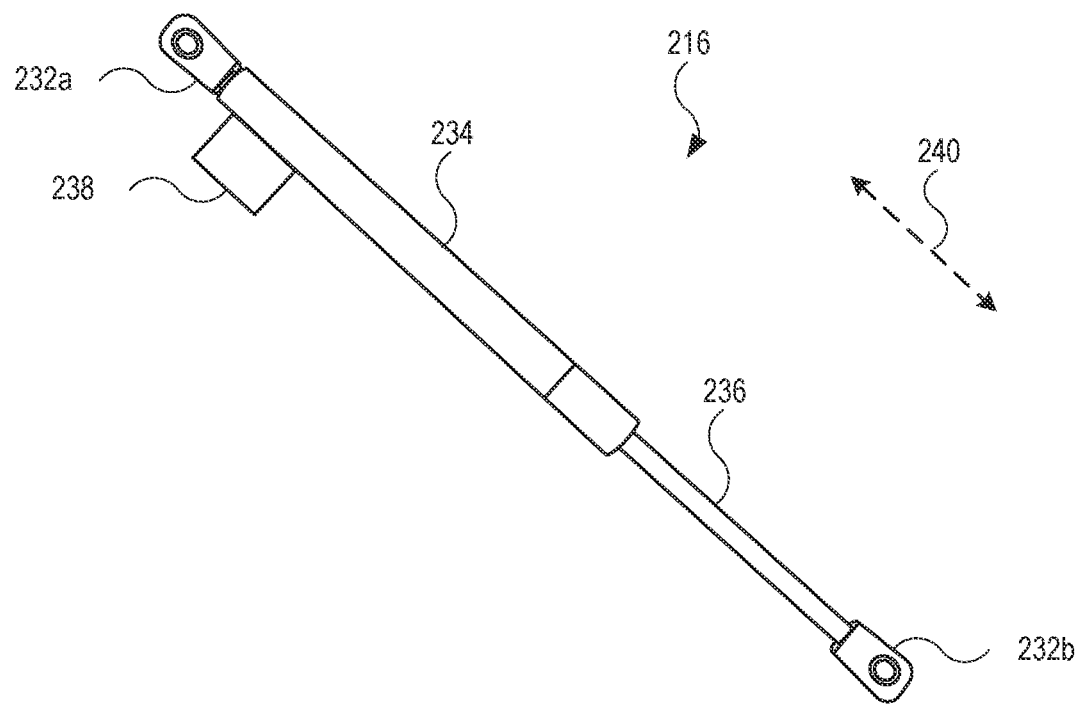
FIG. 6A and FIG. 6B illustrate perspective views of examples of drive units, in accordance with aspects of the present disclosure.
Figure 6B:
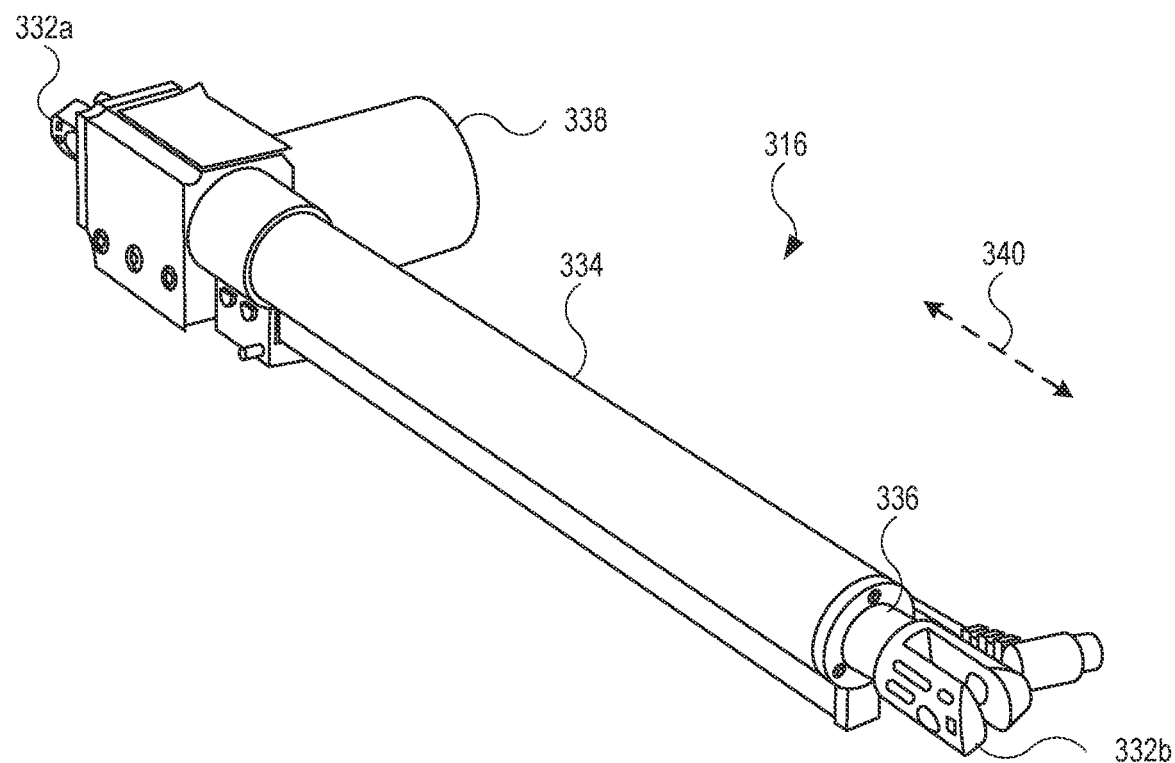

FIG. 6A and FIG. 6B illustrate perspective views of examples of drive units, in accordance with aspects of the present disclosure. The drive units shown and described in FIGS. 6A and 6B may be implemented as the drive units 116a and 116b (shown in FIG. 5). Referring to FIG. 6A, the drive unit 216 may take the form of a strut. In particular, the drive unit 216 may take the form of a power strut. As shown, the drive unit 216 may include an end 232a and an end 232b designed to couple with a vehicle and a closure, respectively. The drive unit 216 may further include a cylinder 234 and a shaft 236 designed to move relative to the cylinder 234 in either direction of a two-sided arrow 240. Optionally, the drive unit 216 may include a motor 238 designed to operate based on received commands from a controller (e.g., controller 122 shown in FIG. 5).

In one or more implementations, the drive unit 216 takes the form of a pneumatic strut and the motor 238 is designed to fill the cylinder 234 with gas, thus providing compressed gas used to actuate the shaft 236. Subsequently, the air can be removed from the cylinder 234 by, for example, a valve (not shown in FIG. 6A), thus allowing the shaft 236 to return, or at least partially return, into the cylinder 234. In one or more implementations, the shaft 236 and the motor 238 are in a geared relationship, and the motor 238 drives one or more gears, thus applying torque to a gear coupled to the shaft 236, which in turn actuates the shaft 236 in either direction of the two-sided arrow 240 (based on the rotational direction of the aforementioned gears).

Referring to FIG. 6B, the drive unit 316 takes the form of an actuator. In particular, the drive unit 316 may take the form of a linear actuator. As shown, the drive unit 316 may include an end 332a and an end 332b designed to couple with a vehicle and a closure, respectively. The drive unit 316 may further include a cylinder 334 and a shaft 336 designed to move relative to the cylinder 334 in either direction of a two-sided arrow 340. The drive unit 216 may further include a motor 338 designed to operate based on received commands from a controller (e.g., controller 122 shown in FIG. 5). In one or more implementations, the motor 338 drives a threaded component (e.g., screw), thus causing actuation of the shaft 336.

Figure 7:
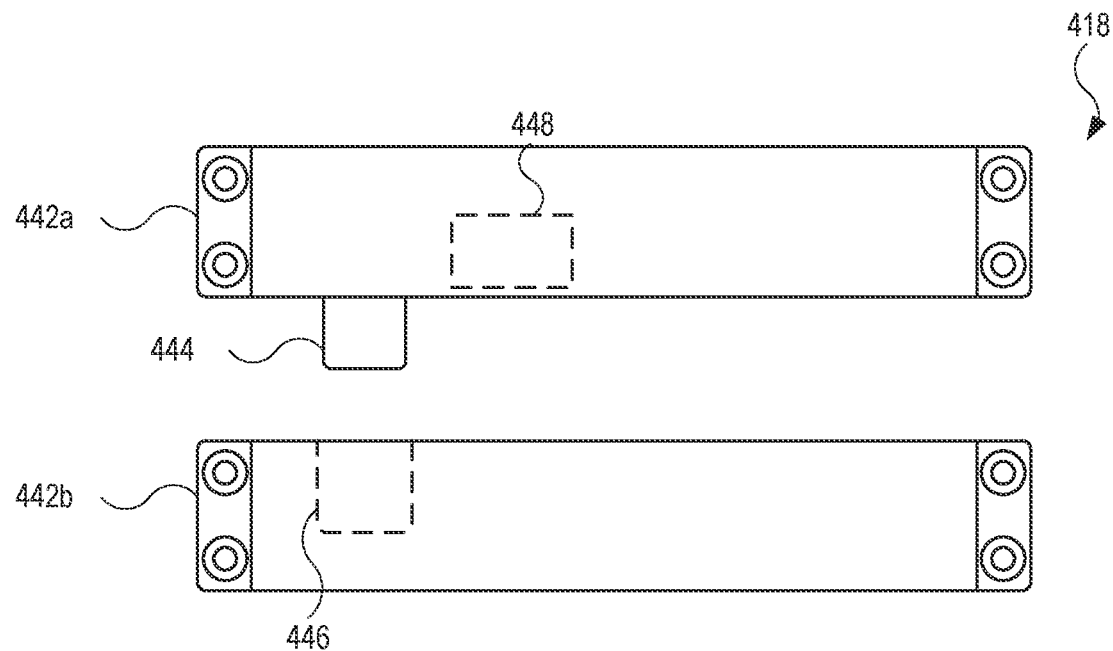
FIG. 7 illustrates a perspective view of an example of a latch, in accordance with aspects of the present disclosure.

FIG. 7 illustrates a perspective view of an example of a latch 418, in accordance with aspects of the present disclosure. The latch 418 (and an additional, similar latch) may be implemented as the latches 118a and 118b (shown in FIG. 5). As shown, the latch 418 may include a latch portion 442a and a latch portion 442b. The latch portion 442a may couple to a closure (e.g., closure 112a, shown in FIG. 5) and the latch portion 442b may couple to a closure (e.g., closure 112b, shown in FIG. 5). However, other implementations, the latch portion 442a and the latch portion 442b couple to the closure 112b and the closure 112a, respectively. The latch portion 442a may include a bolt 444 and the latch portion 442b may include a receptacle 446b designed to receive the bolt 444. When the latch 418 is implemented in a vehicle, the latch portions 442a and 442b are positioned close enough to each other such that the bolt 444, in an extended position (e.g., shown in FIG. 7), enters the receptacle 446. When the bolt 444 is positioned in the receptacle 446, the closures, to which the latch portions 442a and 444b are coupled, are coupled together. As a result, one or more drive units causing movement of one closure (e.g., the closure 112a shown in FIG. 5) also causes movement of the remaining closure (e.g., the closure 112b shown in FIG. 5). Additionally, the latch portion 442a may include a motor 448 designed to operate based on received commands from a controller (e.g., controller 122 shown in FIG. 5). In this regard, the motor 448 is designed to actuate the bolt 444 into and out of the receptacle 446.

Figure 8:
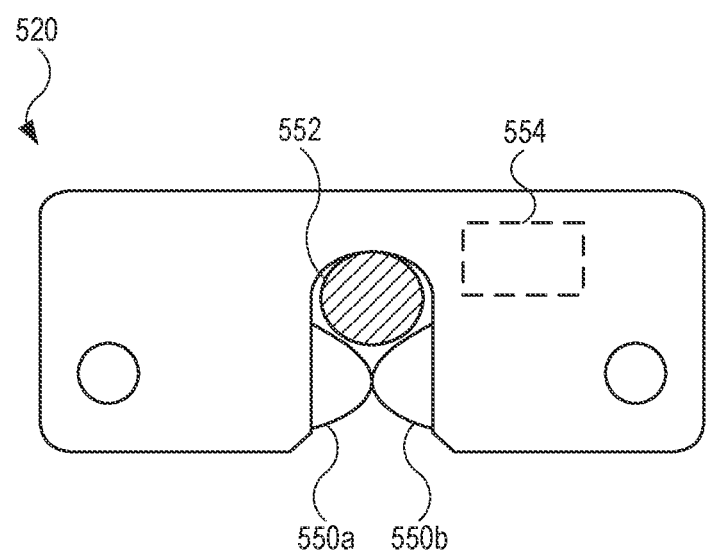
FIG. 8 illustrates a plan view of an additional or alternate example of a latch, in accordance with aspects of the present disclosure.

FIG. 8 illustrates a plan view of an additional or alternate example of a latch 520, in accordance with aspects of the present disclosure. The latch 520 may be implemented as the latch 120 (shown in FIG. 5). The latch 520 may include a lock mechanism 550a and a lock mechanism 550b. The lock mechanisms 550a and 550b may be referred to as locking arms. The lock mechanisms 550a and 550b are designed to couple with a bolt 552, shown as a partial cross section. In one or more implementations, the latch 520 is coupled to a closure (e.g., closure 112b shown in FIG. 5) and the bolt 552 is secured to a body of a vehicle (e.g., the body 101 of the vehicle 100 shown in FIG. 5). The latch 520 may further include an actuator 554 (e.g., a motor) designed to operate based on received commands from a controller (e.g., controller 122 shown in FIG. 5). In this regard, the actuator 554 is designed to actuate the lock mechanisms 550a and 550b to couple with or release the bolt 552.

Figure 9:
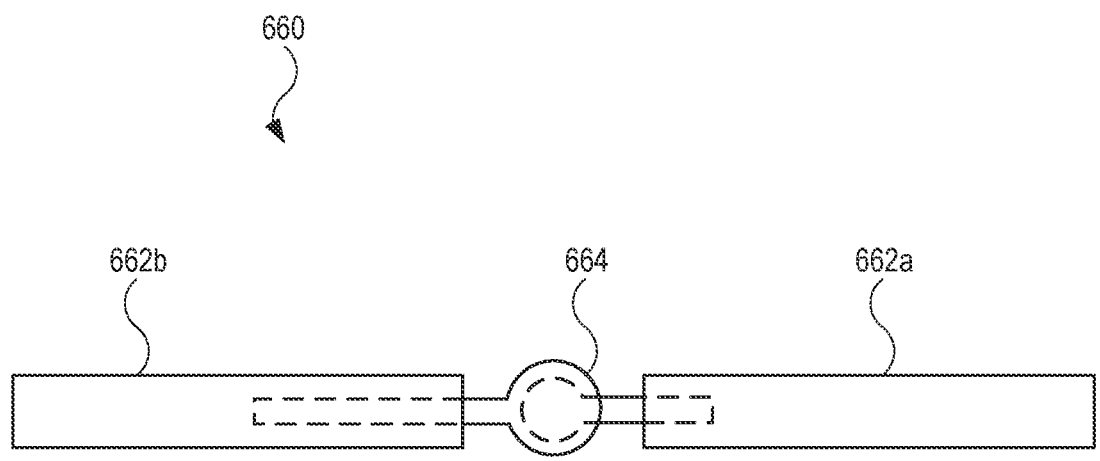
FIG. 9 illustrates a side view of an example of a hinge, in accordance with aspects of the present disclosure.

FIG. 9 illustrates a side view of an example of a hinge 660, in accordance with aspects of the present disclosure. The hinge 660 (and an additional, similar hinge) may be implemented as the hinges 126a and 126b (shown in FIG. 5). The hinge 660 may include a hinge portion 662a and a hinge portion 662b connected to the hinge portion 662a. The hinge portion 662a may be designed to couple with a closure (e.g., the closure 112a shown in FIG. 5), while the hinge portion 662b may be designed to couple with a closure (e.g., the closure 112b shown in FIG. 5). In this regard, the hinge 660 may allow movement of one closure (e.g., the closure 112a) relative to another closure (e.g., the closure 112b). Additionally, the hinge portions 662a and 662b may be frictionally engaged together by a friction assembly 664. The frictional force provided by the friction assembly 664 may allow the hinge 660 to support the weight of a closure when the closure is in an open position.

Further, the hinge 660 (and an additional, similar hinge) may be implemented as the hinges 128a and 128b (shown in FIG. 5). The hinge portion 662a may be designed to couple with a closure (e.g., the closure 112b shown in FIG. 5), while the hinge portion 662b may be designed to couple with a body of a vehicle (e.g., the body 101 of the vehicle 100 shown in FIG. 5). In this regard, the hinge 660 may allow movement of multiple closures (e.g., the closures 112a and 112b) relative to the body. The frictional force provided by the friction assembly 664 may be adjusted to allow the hinge 660 to support the weight of multiple closures when the closures are in an open position. Optionally, the hinge 660 may include a detent (not shown in FIG. 9) integrated with the friction assembly 664 or integrated with a body of a vehicle. The detent may provide the hinge 660 with a mechanical stop, thus providing additional load support for multiple closures.

Figure 10A:
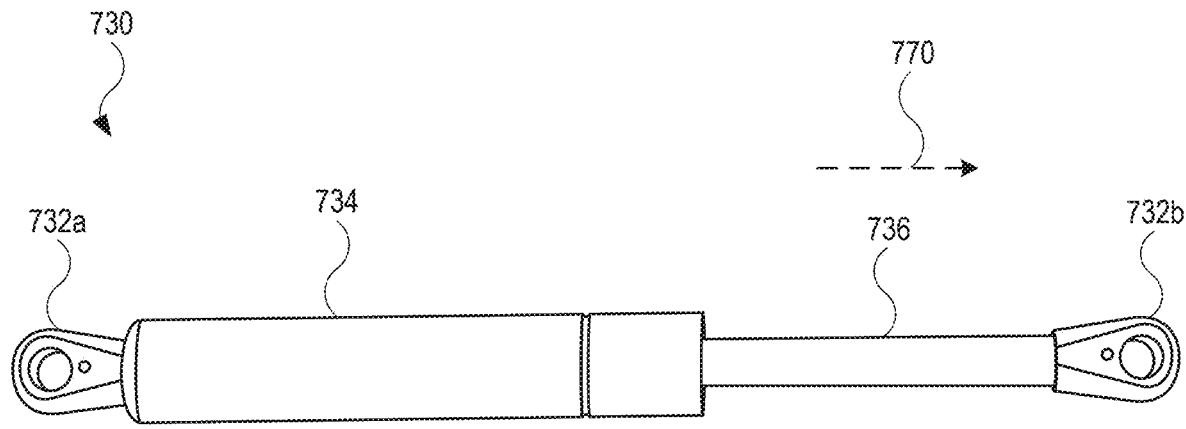
FIG. 10A and FIG. 10B illustrate perspective views of examples of biasing mechanisms, in accordance with aspects of the present disclosure.
Figure 10B:
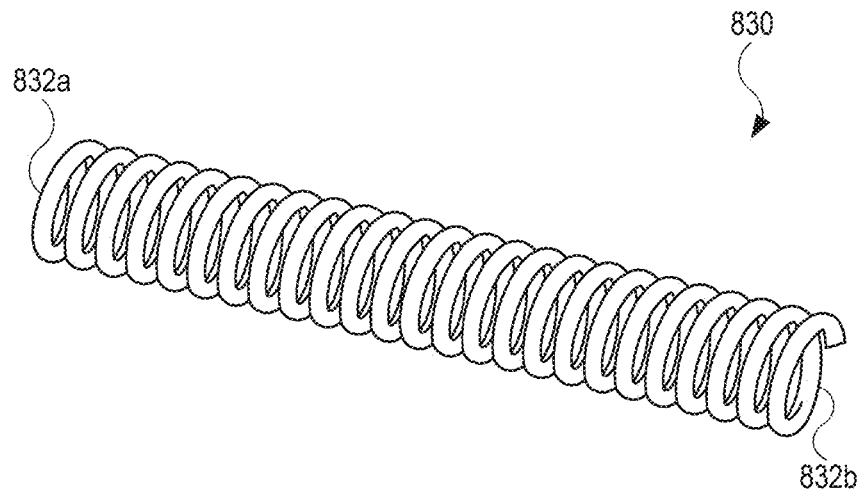

FIG. 10A and FIG. 10B illustrate perspective views of examples of biasing mechanisms, in accordance with aspects of the present disclosure. The biasing mechanisms shown and described in FIGS. 10A and 10B may be implemented as the biasing mechanisms 130a and 130b (shown in FIG. 5). Referring to FIG. 10A, the biasing mechanism 730 may take the form of a strut. In particular, the biasing mechanism 730 may take the form of a gas strut. As shown, the biasing mechanism 730 may include an end 732a and an end 732b designed to couple with a vehicle and a closure (e.g., closure 112b shown in FIG. 5), respectively. The biasing mechanism 730 may further include a cylinder 734 and a shaft 736 capable of moving relative to the cylinder 734. However, based upon, for example, internal gas pressure within the cylinder 734, the shaft 736 is biased in a direction of an arrow 770. In this regard, when a force from one or more closures is applied to the shaft 736 in a direction opposite the arrow 770, the biasing mechanism 730 may provide a force (e.g., a counterbalance force) to support the weight of the closure(s).

Referring to FIG. 10B, the biasing mechanism 830 takes the form of a spring. As shown, the biasing mechanism 830 may include an end 832a and an end 832b designed to couple with a vehicle and a closure (e.g., the closure 112b shown in FIG. 5), respectively. The biasing mechanism 830 may include a spring constant allowing the biasing mechanism 830 to provide a force (e.g., a counterbalance force) to support the weight of a closure to which the biasing mechanism 830 is secured. Additionally, the biasing mechanism 830 may support the weight of an additional closure (e.g., the closure 112a shown in FIG. 5).

Figure 11:
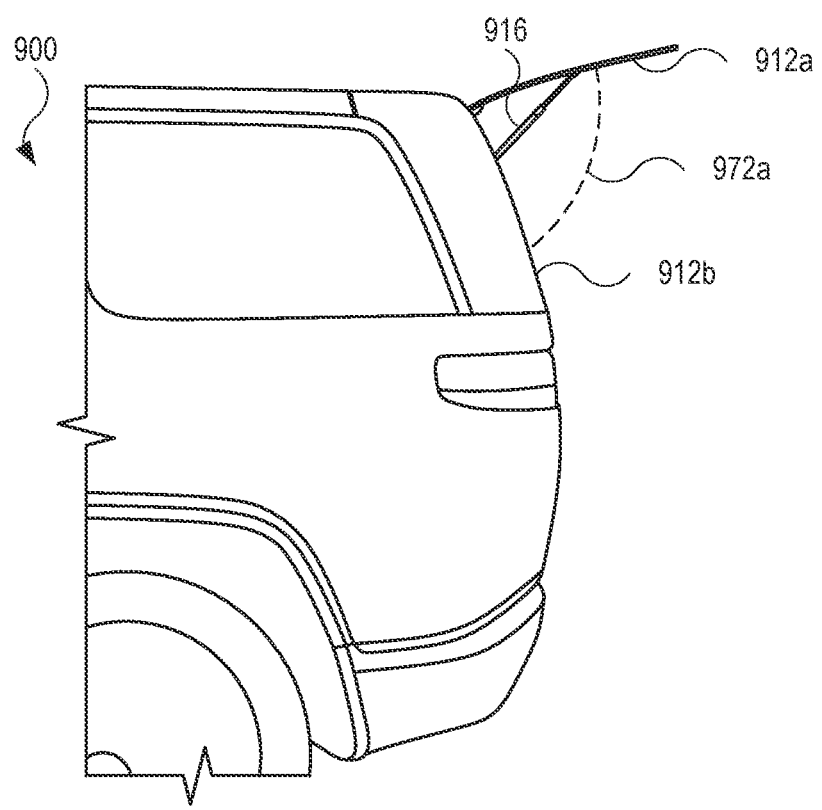
FIG. 11 and FIG. 12 illustrate side views of a vehicle, showing a closure positioned at different angles, in accordance with aspects of the present disclosure.
Figure 12:
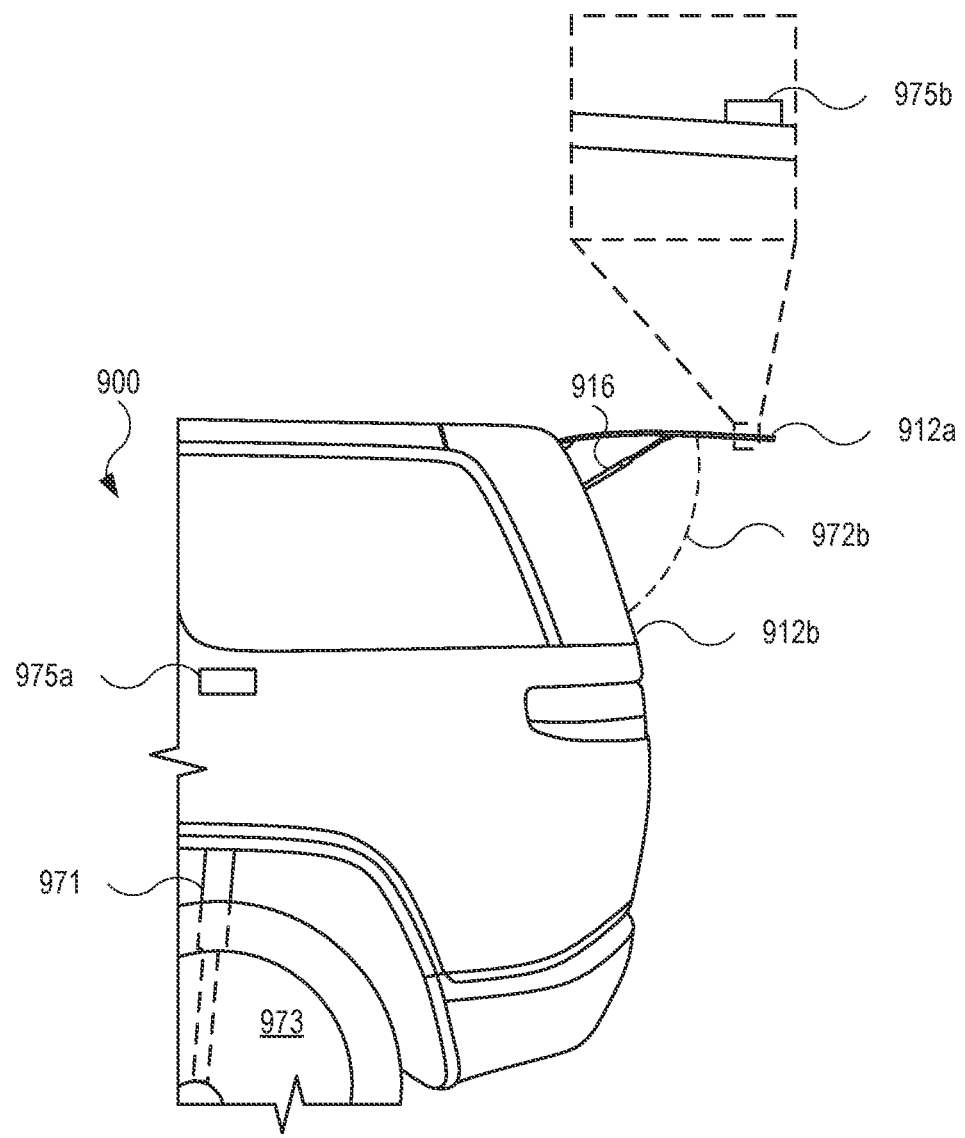

FIG. 11 and FIG. 12 illustrate side views of a vehicle 900, showing a closure 912a positioned at different angles, in accordance with aspects of the present disclosure. The vehicle 900 may include any features shown and/or described herein for a vehicle. Referring to FIG. 11, the closure 912a is in an open position, and is moved, by a drive unit 916 (which may be representative of an additional drive unit), relative to a closure 912b (in a closed position) of the vehicle 900. As shown, the closure 912a is separated from the closure 912b by an angle 972a. In one or more implementations, the angle 972a is greater than 90 degrees. Based on the open position of the closure 912a, the vehicle 900 may provide various functional enhancements. For example, the open position of the closure 912a may provide a user with access to a rear portion of the vehicle 900. As a result, the user may place objects or remove objects from the vehicle 900. Alternatively, the open position of the closure 912a may allow relatively long objects (e.g., posts) to partially lie within the vehicle 900 while also extending out of the vehicle 900. As another example, the open position of the closure 912a may increase airflow through the vehicle 900 when, for example, an additional window (not shown in FIG. 11) is in an open position. As yet another example, the open position of the closure 912a may enhance aerodynamics of the vehicle 900 while the vehicle 900 is being propelled (e.g., being driven by a user). Thus, the open position of the closure 912a may decrease drag due to airflow around the vehicle 900.

Referring to FIG. 12, the closure 912a is in an open position and is separated from the closure 912b by an angle 972b, which is different from the angle 972a (shown in FIG. 11). In one or more implementations, the angle 972b is less than 90 degrees. In this regard, the drive unit 916 is designed to position the closure 912a at different angles. Moreover, in addition to the exemplary angles shown in FIGS. 11 and 12, the drive unit 916 may position the closure 912a relative to the closure 912b at an angle approximately in the range of 0 to 120 degrees.

As non-limiting examples, the closure 912a may be moved by automated means, including by a user providing an input to a controller (not shown in FIGS. 11 and 12) to operate a motor, for example. Additionally, the automated means may include actuating the closure 912a based on the occurrence of one or more conditions. For example, the closure 912a may be designed to move to a particular angle when the vehicle 900 is driven at or above a certain speed. Moreover, the angle of the closure 912a may again change (e.g., the closure 912a can open further or moved toward a closed position) based on a change in speed of the vehicle 900. By positioning the closure 912a at a particular angle for a given speed (or a given range of speeds), the aerodynamics of the vehicle 900 may be enhanced. Additionally, the closure 912a may be actuated, by automated means, to an angle based on road conditions (e.g., smooth highway, rugged off-road terrain). For example, as shown in FIG. 12, the vehicle 900 may include a shock absorber 971 (representative of additional struts) that provides feedback to the vehicle 900, which may be used to determine the type of surface on which the vehicle 900 is traveling. Further, the closure 912a may be actuated, by automated means, to an angle based on one or more sensors in the vehicle 900. For example, as shown in FIG. 12, the vehicle 900 may include a sensor 975a and a sensor 975b. In one or more implementations, the sensor 975a includes a temperature sensor (e.g., thermistor, thermocouple, semiconductor based circuit, or the like) designed to measure cabin temperature of the vehicle 900. As an example, when the cabin temperature of the vehicle 900 reaches or exceeds a predetermined temperature, as determined by the sensor 975a, the drive unit 916 may open the closure 912a. Additionally or alternatively, the sensor 975a may include an image sensor (e.g., camera) designed to captures images (e.g., still images, motion images) external to the vehicle 900, which may be used to determine the type of surface on which the vehicle 900 is traveling. Additionally or alternatively, the sensor 975a may include a speed sensor designed to determine a current speed of the vehicle 900 based on, for example, measuring rotational speed of a wheel 973 (representative of additional wheels) of the vehicle 900. Accordingly, the sensor 975a may provide an input that is used to determine an angle of the closure 912a.

In one or more implementations, the sensor 975b includes a proximity sensor (e.g., capacitive sensor, ultrasonic sensor, photoelectric sensor, or the like) coupled with the closure 912a and designed to measure a distance between the closure 912a and an object (not shown in FIG. 12). As an example, when the closure 912a is at or below a predetermined distance from an object, as determined by the sensor 975b, additional instructions may be provided to the drive unit 916 that causes movement of the closure 912a to cease, thus preventing the closure 912a from contacting the object. Additionally or alternatively, the sensor 975b may include a liquid sensor designed to detect the presence of liquid or moisture to which the vehicle 900 is exposed based on, for example, a change in detected capacitance due to the presence of liquid. In one or more implementations, the sensor 975b may provide an input that is used to limit an angle of the closure 912a, including whether to place the closure 912a in a closed position.

Each of the sensors 975a and 975b may provide inputs used to generate a command to automatically (e.g., without an input or authorization from a user) control movement the closure 912a. For example, when the sensor 975a takes the form of a speed sensor, a command may be automatically generated by the sensor 975a that causes the drive unit 916 to open the closure 912a to predetermined angle, which may be based in part on the speed of the vehicle 900. Alternatively, the drive unit 916 may open or close the closure 912a in response to the vehicle 900 providing a notification, based on at input generated from at least one of the sensors 975a and 975b, to the user and the user confirming a desire to open or close, respectively, the closure 912a. For example, when the sensor 975a takes the form of a temperature sensor, the sensor 975a may provide an input indicating a current temperature inside the cabin of the vehicle 900. If the temperature is at or above a predetermined temperature, the vehicle 900 may provide a notification to a user related to the temperate and provide an option for the user to open the closure 912a.

Figure 13:
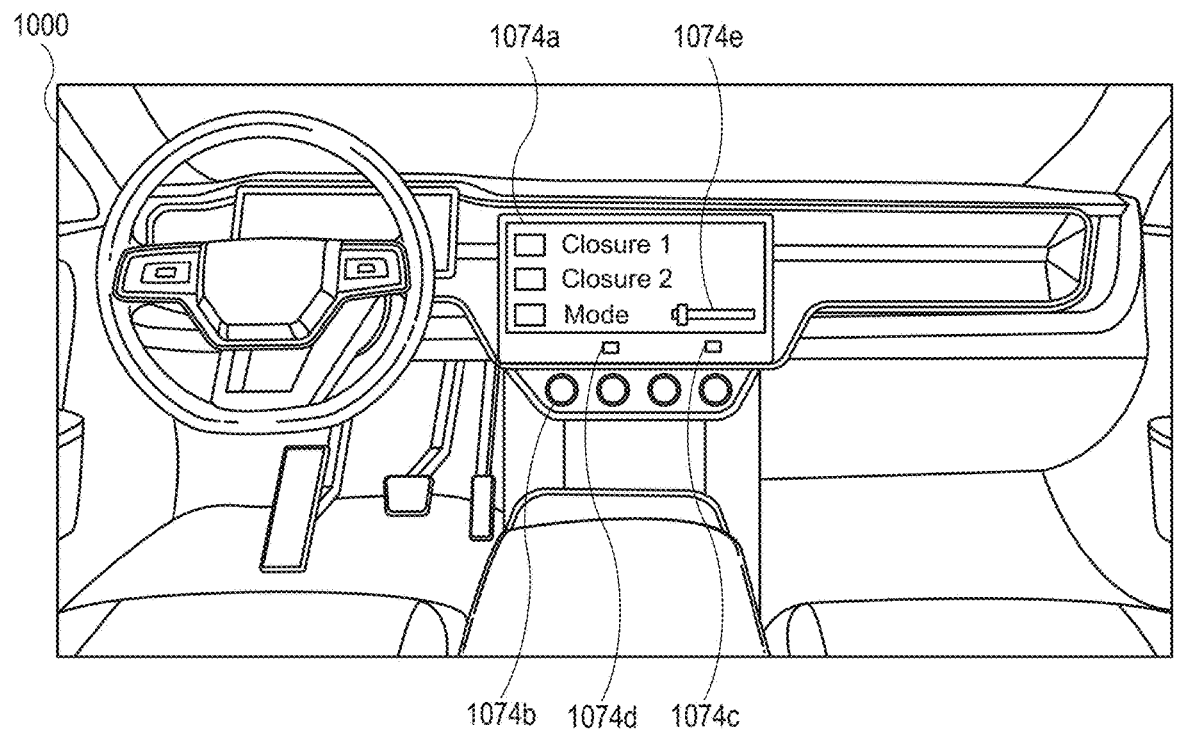
FIG. 13 illustrates an interior of a vehicle, showing various user inputs of the vehicle for providing information for controlling movement of closures of the vehicle, in accordance with aspects of the present disclosure.

FIG. 13 illustrates an interior of a vehicle 1000, showing various user input devices of the vehicle 1000 for providing information for controlling movement of closures of the vehicle 1000, in accordance with aspects of the present disclosure. As shown, the vehicle 1000 may include a user input 1074a. In one or more implementations, the user input 1074a includes a touch display (e.g., capacitive touch display) capable of receiving inputs, such as touch inputs or gestures from a user. As shown, the user input 1074a may present visual information in the form of options for a user to control movement of one or more closures (e.g., closures 112a and 112b shown in FIG. 5). For example, an option (e.g., "Closure 1") may include an option, when selected by interaction with the user input 1074a, to move one closure relative to another closure. Another option (e.g., "Closure 2") may include an option, when selected by interaction with the user input 1074a, to control movement of multiple closures relative to the vehicle 1000. Yet another option (e.g., "Mode") may include one of a variety of modes, when selected by interaction with the user input 1074a, to control movement of one or more closures in a desired manner. For example, a mode may provide for a closure (e.g., closure 112a shown in FIG. 5) to move to a predetermined angle. As another example, the option may set the closure to move to a predetermined angle based upon a speed of the vehicle 1000. Beneficially, users of the vehicle 1000 may use the user input 1074a to remotely control one or both closures (e.g., without manually engaging either of the closures).

The vehicle 1000 may further include a user input 1074b. In one or more implementations, the user input 1074b includes a button, a dial, or a combination thereof. Based on interacting (e.g., rotating, depressing) with the user input 1074b, the user may select an option for controlling movement of one or more closures of the vehicle 1000. The vehicle 1000 may further include a user input 1074c. In one or more implementations, the user input 1074c includes an audio transducer (e.g., microphone) designed to convert audible sound into electrical signals. In this regard, the user input 1074c may receive voice-based commands from a user to select an option for controlling movement of one or more closures of the vehicle 1000. The vehicle 1000 may further include a user input 1074d. In one or more implementations, the user input 1074d includes an image sensor (e.g., camera) designed to detect user movements (e.g., gestures), some of which may correspond to a command for selecting an option to control movement of one or more closures of the vehicle 1000. Accordingly, the command may be interpreted by the vehicle 1000 as a selected option controlling movement of one or more closures of the vehicle 1000. Further, the user input 1074a, in the form of a display, may present a user input 1074e as virtual content (e.g., computer-generated images). In one or more implementations, the user input 1074e is presented on the user input 1074a as a slider bar and a button movable with respect to the slider bar. When moved, the button may provide an input used to control movement of one or more closures of the vehicle 1000. Moreover, the position of the button on the slider bar may correspond to a particular position (e.g., angle) of one or more closures of the vehicle 1000. For example, by moving the button to a midpoint of the slider bar, a command may be generated to move one or more closures halfway, or 50%, of the maximum angle allowable by one or more drive units of the vehicle 1000. Accordingly, the user input 1074e may be provide specific, angular-based movements of one or more closures of the vehicle 1000. Also, while the user input 1074e is presented as virtual content on the user input 1074a, in one or more implementations, the user input 1074e is external to the user input 1074a and implemented as a physical slider bar and physical button, and used in the same or similar manner as described when presented as virtual content. The available options for users interacting with the user inputs 1074b, 1074c, 1074d, and 1074e may include any option described for the user input 1074a.

Figure 14A:
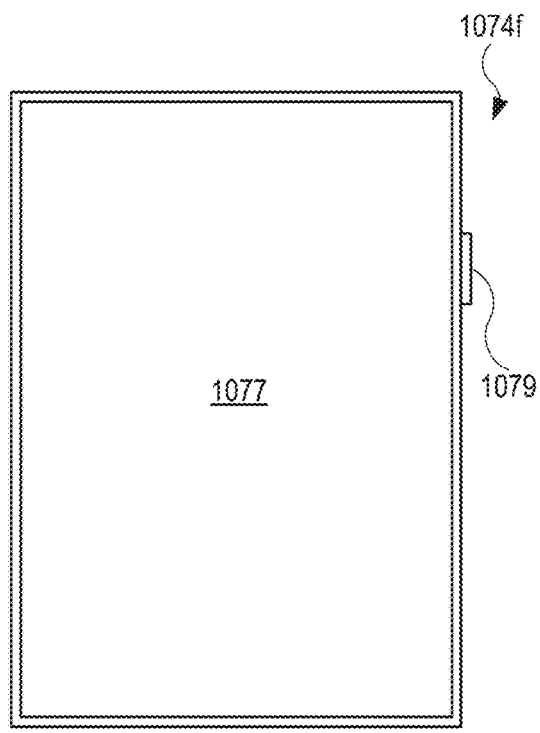
FIG. 14A and FIG. 14B illustrate examples of additional user inputs, in accordance with aspects of the present disclosure.
Figure 14B:
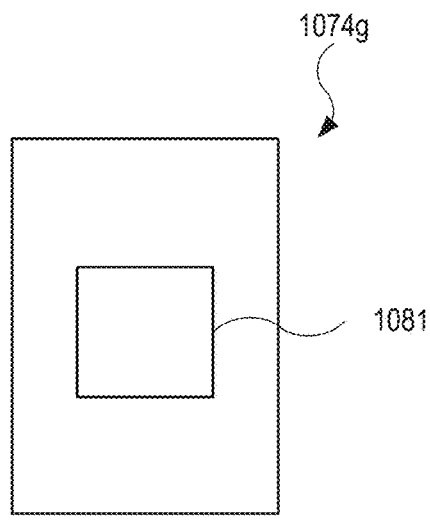

In addition to user inputs physically integrated with vehicle 1000, several non-integrated user inputs may be used to select one or more options to control movement of one or more closures of a vehicle described herein. For example, FIG. 14A and FIG. 14B illustrate examples of additional user inputs, in accordance with aspects of the present disclosure. Referring to FIG. 14A, a user input 1074f may take the form of a mobile wireless communication device (e.g., smartphone). The user input 1074f may include a display 1077, such as a touch display (e.g., capacitive touch display) capable of receiving inputs (e.g., touch inputs or gestures) from a user. The user input 1074f may further include a button 1079 capable of being depressed by a user. In this regard, display 1077 and/or the button 1079 may be used to generate commands to the vehicle 1000 (shown in FIG. 13) in order to select an option. Referring to FIG. 14B, a user input 1074g may take the form of a fob (e.g., key fob). The user input 1074g may include a button 1081 capable of being depressed by a user. The button 1081 may be used to generate commands to the vehicle 1000 (shown in FIG. 13) in order to select an option. The options available by the user inputs 1074f and 1074g may include any option described for the user input 1074a (shown in FIG. 13). Although not shown, each of the user inputs 1074f and 1074g may further include wireless circuitry designed to transmit wireless data (e.g., generated commands) through radio frequency (RF) communication in accordance with a wireless communication protocol (e.g., BLUETOOTH®).

Figure 15:
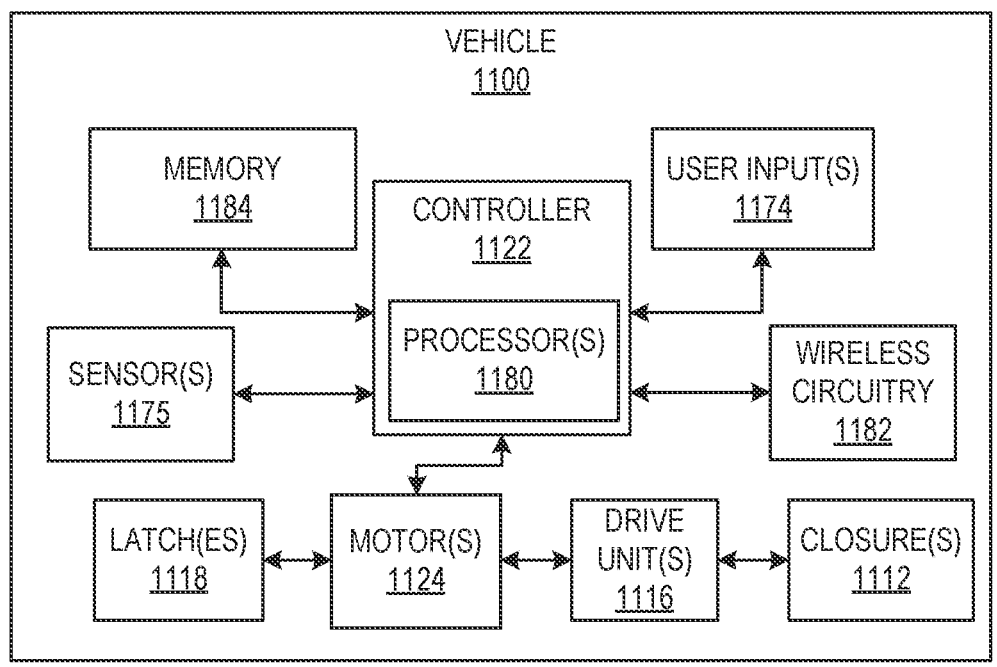
FIG. 15 illustrates a block diagram of a vehicle, in accordance with aspects of the present disclosure.

FIG. 15 illustrates a block diagram of a vehicle 1100, in accordance with aspects of the present disclosure. The vehicle 1100 may include a controller 1122. In one or more implementations, the controller 1122 includes one or more processors 1180. The one or more processors 1180 may include processing circuitry, such as a central processing unit (CPU), a graphics processing unit (GPU), one or more microcontrollers, an application specific integrated circuit (ASIC), or a combination thereof, as non-limiting examples. The vehicle 1100 may further include one or more closures 1112, one or more drive units 1116, one or more latches 1118, and one or more motors 1124. In one or more implementations, at least some of the one or more motors 1124 may be integrated with the one or more drive units 1116. Alternatively, in one or more implementations, at least some of the one or more motors 1124 may be separate from, but in electrical communication with, the one or more drive units 1116. The vehicle 1100 may further include one or more user inputs 1174. As non-limiting examples, the one or more user inputs 1174 may include a display, a button, a dial, a microphone, or a combination thereof. While the one or more user inputs 1174 are shown as being part of, or integrated with, the vehicle 1100, the one or more user inputs 1174 may be non-integrated user inputs (e.g., mobile wireless communication device, fob). In this regard, the vehicle 1100 may further include wireless circuitry 1182 designed to communicate (e.g., receive) wireless transmission, such as RF communication, from a non-integrated user input (e.g., user inputs 1074f and 1074g shown in FIGS. 14A and 14B, respectively). When the selected user input of the one or more user inputs 1174 is non-integrated with the vehicle, the wireless circuitry 1182 may be used to receive wireless data from the user input. The vehicle 1100 may further include one or more sensors 1175. As non-limiting examples, the one or more sensors 1175 may include a speed sensor, a temperature sensor, an image sensor, a proximity sensor, a liquid sensor, or a combination thereof.

Additionally, the vehicle 1100 may further include memory 1184 that stores instructions and/or code, each of which being executable by the one or more processors 1180. The memory 1184 may include read-only memory (ROM) and or random access memory (RAM).

In an exemplary operation, a touch input or gesture to a user input of the one or more user inputs 1174 provides an input to the controller 1122. The one or more processors 1180 may execute instructions stored on the memory 1184, which results in instructions or commands to the one or more motors 1124 to actuate the one or more drive units 1116. Additionally, the instructions may cause the one or more latches 1118 to decouple the one or more closures 1112 from each other. The instructions may cause the one or more latches 1118 couple together the one or more closures 1112. Further, the instructions may cause a latch of the one or more latches 1118 to decouple a closure of the one or more closures 1112 from a body of the vehicle 1100. As a result, the one or more drive units 1116 may actuate the one or more closures 1112 in accordance with the touch input or gesture to the one or more user inputs 1174. Thus, each of the one or more closures 1112, the one or more drive units 1116, the one or more latches 1118, and the one or more motors 1124 are controllable by the controller 1122 based on user interaction with the one or more user inputs 1174. Accordingly, the controller 1122 can generate a set of instructions for controlling movement of the one or more closures 1112. For example, a set of instructions provided by the controller 1122 may cause a closure of the one or more closures 1112 to move relative to another closure of the one or more closures 1112. In another example, a set of instructions provided by the controller 1122 may cause multiple closures of the one or more closures 1112 to move relative to a body of the vehicle 1100. Additionally, the controller 1122 may generate instructions based on one or more inputs from the one or more sensors 1175, which may alter (e.g., increase, decrease) an angle at which a closure of the one or more closures 1112 is positioned.

Figure 16:
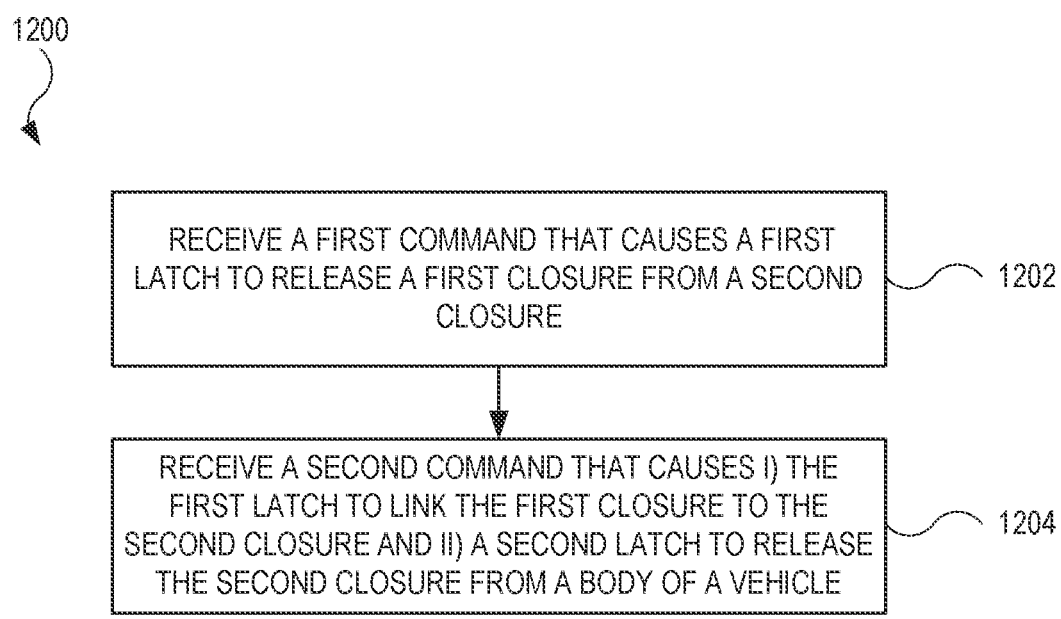
FIG. 16 illustrates a flow diagram showing an example of a process that may be performed for controlling movement of closures of a vehicle, in accordance with aspects of the present disclosure.

FIG. 16 illustrates a flow diagram showing an example of a process 1200 that may be performed for controlling movement of closures of a vehicle, in accordance with aspects of the present disclosure. For explanatory purposes, the process 1200 is primarily described herein with reference to a system having one or more components in conjunction with controlling movement of one or more closures of a vehicle (e.g., vehicle 100 shown in FIG. 1). However, the process 1200 is not limited to implementation in the vehicle 100 in FIG. 6, and one or more blocks (or operations) of the process 1200 may be performed by one or more other components of other suitable moveable apparatuses, devices, or systems. For example, the process 1200 may be applicable to the vehicle 900 shown in FIGS. 11 and 12, or to the vehicle 1100 shown in FIG. 15. Further, for explanatory purposes, some of the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

At step 1202, a first command is received. The first command may cause a first latch to release a first closure from a second closure. Based on the first latch releasing the first closure from the second closure, the first closure may be actuated relative to the second closure. In one or more implementations, the first closure is a glass substrate and the second closure is a liftgate.

At step 1204, a second command is received. The second command may cause i) the first latch to link the first closure to the second closure and ii) a second latch to release the second closure from a body of a vehicle. Based on linking the first latch to the second closure, the first closure may be actuated relative to the second closure. Based on the second latch releasing the second closure from the vehicle, the first closure and the second closure may be actuated relative to the vehicle.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system, comprising:
a drive unit;
a first closure coupled to the drive unit;
a second closure coupled to the first closure;
a first hinge configured to couple with the first closure and the second closure;
a second hinge configured to couple with the second closure and a vehicle body; and
a latch configured to releasably couple the first closure with the second closure, wherein:
in a first position of the latch, movement of the drive unit causes the first closure to move relative to the second closure based on the first hinge, and
in a second position of the latch, movement of the drive unit causes the second closure to move with the first closure based on the second hinge.

2. The system of claim 1, wherein:
the first closure comprises a glass substrate, and
the second closure comprises a liftgate configured to receive the glass substrate.

3. The system of claim 1, wherein:
the first hinge is configured to rotate along a first axis of rotation, and
the second hinge is configured to rotate along a second axis of rotation different from the first axis of rotation.

4. The system of claim 1, further comprising a user input, wherein the drive unit and the latch are controllable by an input to the user input.

5. The system of claim 1, further comprising:
a second latch, wherein:
the system comprises a vehicle, and
the second latch releasably couples the second closure to the vehicle.

6. The system of claim 1, wherein:
in a first mode, the drive unit is configured to position the first closure at a first angle, and
in a second mode, the drive unit is configured to position the first closure at a second angle different from the first angle.

7. The system of claim 6, further comprising a sensor, wherein the drive unit is configured to position the first closure the first angle based on the sensor.

8. The system of claim 7, wherein the sensor comprises at least one of a speed sensor, an image sensor, a proximity sensor, or a liquid sensor.

9. A vehicle, comprising:
a body;
a liftgate configured to carry a glass substrate;
a first latch configured to releasably couple the glass substrate with the liftgate;
a drive unit;
a second latch configured to releasably couple the liftgate with the body; and a controller configured to:
provide a first set of instructions that causes the first latch to release the glass substrate from the liftgate,
provide a second set of instructions to cause i) the first latch to link the glass substrate to the liftgate and ii) the second latch to release the liftgate from the body, and
provide a third set of instructions that causes the drive unit to move the glass substrate in accordance with a speed of the vehicle, wherein;
in a first mode, the drive unit is configured to position the glass substrate at a first predetermined angle, and
in a second mode, the drive unit is configured to position the glass substrate at a second predetermined angle different from the first predetermined angle.

10. The vehicle of claim 9, wherein the controller is further configured to:
provide the first set of instructions to further cause the drive unit to actuate glass substrate to move relative to the liftgate, and
provide the second set of instructions to further cause the drive unit to actuate the glass substrate, thereby causing the liftgate to move with the glass substrate based on the first latch.

11. The vehicle of claim 9, further comprising a display, wherein the controller is further configured to provide a fourth set of instructions that causes the drive unit to move the glass substrate in accordance with a user input to the display.

12. The vehicle of claim 10, wherein the drive unit comprises a power strut.

13. The vehicle of claim 12, wherein:
the drive unit further comprises a motor, and
the first set of instructions causes the motor to actuate the power strut.

14. The vehicle of claim 9, further comprising a user input, wherein the controller is further configured to:
provide, based on a first input to the user input, the first set of instructions, and
provide, based on a second input to the user input, the second set of instructions.

15. The vehicle of claim 9, further comprising a biasing mechanism coupled to the body and the liftgate, wherein in response to the controller providing the second set of instructions, the biasing mechanism counterbalances the liftgate.

16. A vehicle, comprising:
a body;
a liftgate configured to carry a glass substrate;
a first latch configured to releasably couple the glass substrate with the liftgate;
a first hinge configured to rotate, about a first axis of rotation, the glass substrate relative to the liftgate;
a second latch configured to releasably couple the liftgate with the body;
a second hinge configured to rotate, about a second axis of rotation different from the first axis of rotation, the glass substrate and the liftgate; and
a controller configured to:
receive a first command that causes a first latch to release the glass substrate from the liftgate; and
receive a second command that causes i) the first latch to link the glass substrate to the liftgate and ii) the second latch to release the liftgate from the body.

17. The vehicle of claim 16, wherein:
the first command further causes a drive unit to actuate the glass substrate to move relative to the liftgate, and
the second command further causes the drive unit to actuate the glass substrate, thereby causing the liftgate to move with the glass substrate based on the first latch.

18. The vehicle of claim 17, wherein the controller is further configured to receive a third command that causes i) the first latch to release the glass substrate from the liftgate and ii) the drive unit to move the glass substrate in accordance with a first mode.

19. The vehicle of claim 16, further comprising a display, wherein the controller is further configured to receive, based on a user input to the display, an input that initiates one of the first command or the second command.

* * * * *